Nov. 10, 1964   R. L. ENGEL ETAL   3,156,821
METHOD OF MONITORING LOW LEVEL RADIOACTIVITY
BY THE STIMULATED GROWTH OF BACTERIA
Filed June 15, 1961
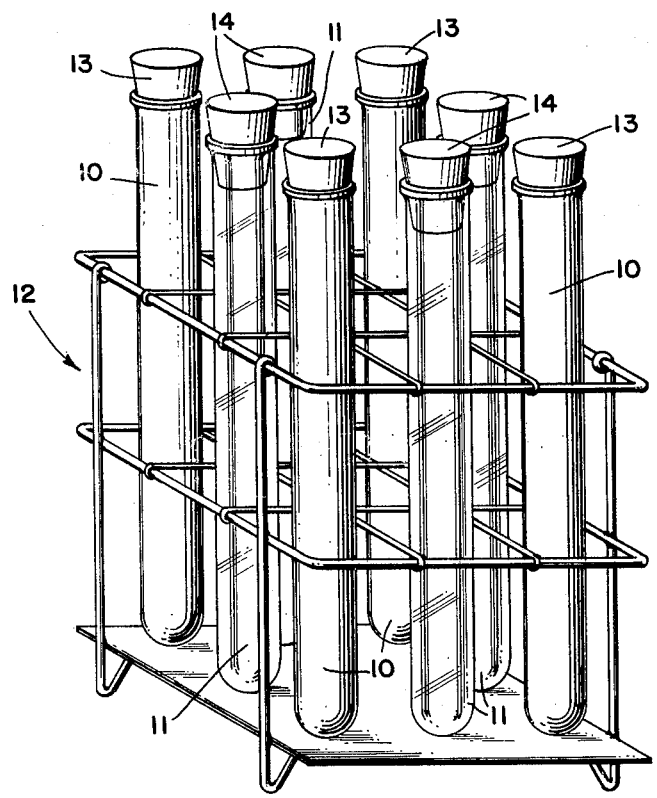
INVENTORS.
RENE L. ENGEL
GIORGIO SOLI
BY
*P. H. Firsht*
ATTORNEY.

3,156,821
METHOD OF MONITORING LOW LEVEL RADIO-ACTIVITY BY THE STIMULATED GROWTH OF BACTERIA

Rene L. Engel, 703A Bowen, China Lake, Calif., and Giorgio Soli, 1340 Sierra Alta Way, Los Angeles, Calif.
Filed June 15, 1961, Ser. No. 117,475
8 Claims. (Cl. 250—83)
(Granted under Title 35, U.S. Code (1952), sec. 266)

The invention described herein may be manufactured and used by or for the Government of the United States of America for governmental purposes without the payment of any royalties thereon or therefor.

The present invention relates to a method of monitoring for low levels of radioactivity and of prospecting for radioactive elements, and more particularly to a method based on the inventors' discovery that low levels of ionizing radiations are capable of affecting the growth of certain slow growing bacterial cells in a manner that such effect can be measured and recorded.

The action of relatively low doses of ionizing radiations of the order of hundreds and thousands of roentgens on living cells is known. However, the action of total doses of the order of fractions and units of the roentgen is practically unknown. Rather, it is generally believed that such low doses cannot appreciably affect living cells. The use of bacterial cells in prospecting for petroleum and natural gas deposits is known, but the use of bacteria in monitoring and prospecting for radioactivity and for radioactive elements is believed to be new.

In the field of prospecting for radioactive ores conventional physical methods such as the ones which utilize Geiger and scintillation counters register the intensity of radiation, whereas, the present invention registers directly the effect produced by a given intensity over a definite and extended period of time on living material thereby furnishing an index of vital importance when monitoring for low levels of radioactivity which might affect human beings, animals, and higher plant life. Furthermore, Geiger and scintallation counters are effective only when the radioactive mineral is outcropping or immediately below the surface. The present biological method permits the detection of radioactive ores at any depth in the ground since the bacteria can be buried at any desired depth and left in place for a long duration. In addition to the advantages of the present invention before mentioned the present method is also an integrator of energy in time, something which cannot be duplicated except by having several counters working for several days in the area to be investigated. The expense of such counters is too high to be generally practical even in those places where such a system is materially possible. Also, the present biological method offers the advantage of being more reliable than physical methods for the detection of directional effects of radiation, due to the great sensitivity of the bacteria utilized, and due to the fact that such baceteria can be left in place for a considerable length of time, thereby diluting the effect of any fluctuating background radiation.

An object of the present invention is to provide a method by means of which monitoring is made possible for low levels of radioactivity as may be present in the vicinity of atomic energy power plants and atomic wastes in the land and in the sea.

Another object is to provide a method which can be used for detection of radioactive material fallout.

A further object of the invention is the provision of a method for detection of radioactive pollution of air, streams, rivers, lakes and soils and radioactivity in space.

Still another important object of the present invention is to provide a method by means of which it is possible to locate and evaluate a radioactive element mineral deposit by the determination of radioactive gradients.

Other objects and many of the attendant advantages of this invention will be readily appreciated as the same becomes better understood by reference to the following detailed description when considered in connection with the accompanying drawing in which like reference numerals designate like parts throughout the figure thereof.

The single figure shows a preferred embodiment of the invention comprising a set of eight bacterial cultures. Four of these cultures are placed each in one of four glass tubes shielded by lead, designated by numeral 10, sealed at one end and closed at the other end with a lead cap 13. The wall thickness of the lead tubes can be approximately 2 cm. The remaining four cultures are placed each in one of four unshielded glass test tubes designated by numeral 11, sealed with a rubber or plastic cap 14 and arranged in alternating order with the lead tubes. This test tube assembly, 12, is tied together and placed at any desired depth in the desired location and left there for a period of time.

Several sets of cultures are prepared in the laboratory by inoculating a certain number of test tubes, of a size of approximately 25 x 150 mm. containing approximately 12 cc. of a suitable culture medium, with a few drops of a suspension of hydrogen-utilizing bacteria or hydrocarbon-oxidizing bacteria. The test tubes ere then filled with the proper atmosphere (hydrogen, or one of the gaseous hydrocarbons, carbon dioxide and air) through a hole in a rubber stopper, and sealed to a leak-proof condition.

Low levels of ionizing radiations of the order of approximately 0.1 milliroentgen per hour, and greater within the fractions of one roentgen can stimulate the growth of certain slow growing microorganisms such as hydrogen-utilizing bacteria or hydrocarbon-oxidizing bacteria.

The majority of bacteria can grow in a common nutrient medium (such as meat extract or peptone medium) in a period of approximately 12 hours, when incubated at the optimum temperature. There are, however, some bacteria such as hydrogen-utilizing bacteria and the hydrocarbon-oxidizing bacteria with a slow metabolism due to the fact that the compound which they specifically utilize as a source of energy is either chemically less reactive or it furnishes smaller amounts of energy. Such microorganisms require a period of several days, instead of several hours to reach maximum growth in an appropriate culture medium, at the optimum temperature of incubation. When these bacteria are placed in the vicinity of a source of ionizing radiations of low level they can be exposed during the entire period of their active growth to a total dose of radiation sufficient to affect their development even though such total dose is very small, of the order of approximately 100 milliroentgens, and even less. All the ionizing radiations, including alpha and beta particles, X and gamma rays, protons and neutrons, and other high energy radiations are capable of affecting the growth of the slow growing hydrogen-utilizing and hydrocarbon-oxidizing bacteria.

Since the biological effect is probably due to an indirect action of the ionizing radiation on the chemical environment, and since such action is cumulative, it is evident that one of the original features of this invention lies just in the use of these hydrocarbon-oxidizing and hydrogen-utilizing bacteria. In fact, these bacteria, being such slow growers and being able to utilize as the only source of energy such simple element or compound as hydrogen and methane (or other gaseous hydrocarbon), whose molecules can be easily ionized and dissociated by radiations in a manner that appears beneficial to the bacteria themselves, offer an ideal tool thereby permitting even small effects to become evident. Also, the fact that ionizing radiation can stimulate the growth of living cells under certain conditions represents a novel way through which low levels of radiation can be detected.

In the practice of the present invention when it is desired to detect any appreciable amount of radioactivity released in the ocean or other body of water, in the earth, or in the air, a certain number of assemblies or cultures of the desired microorganisms are placed at different depths or heights, and at different distances from the source of radioactivity and kept in place for a suitable period of time. After the established period of time has elapsed, all cultures are withdrawn and examined for any difference in the amount of growth between the exposed cultures and the ones shielded inside the lead tubes. The radiation, if present, affects the unshielded cultures and not the cultures contained in the lead tubes. Because the stimulation of growth is a direct function of the dose of radiation, within certain limits of dose, and as the intensity of the radiation decreases with increasing distances from the source, the amount of radiation at different distances from the source can be evaluated from the differences in the amount of growth among the exposed cultures. Knowing the response of a particular strain to doses of radiation, it is possible to measure the dose or total amount of radiation released in a given period of time. Furthermore, since the bacteria utilized are very sensitive to small differences in the amount of radiation that they receive, by orienting each assembly set of cultures so that each one of the four exposed cultures will be at one of four cardinal points, it is possible to determine the point from which the major amount of radiation is coming by measuring the differences in growth among the four exposed cultures. By placing several of these oriented sets of cultures at different locations in the prospective area, the position and size of the radioactive mineral body can be determined.

The differential effect of Uranium versus Thorium may be detected by the respective action of these two elements on the exposed cultures due to radiation differences. Then, by positioning the cultures according to the outcrop geometry of the mineralized zone or zones directional effects may be detected and inference as to depth can be made from the gradients observed on intensity variations. The time required to keep the cultures on location will vary depending on the level of radiation present and on the temperature.

For low levels of radiation and low temperatures, it is necessary to keep the cultures on location for a considerable period of time. Usually for a level of approximately 0.2 milliroentgen per hour and a temperature of approximately 60° F., it would be necessary to keep the cultures exposed for a period of approximately four weeks.

Satisfactory results can be obtained in any temperature range within limits which permit growth of the bacteria used. Temperatures below the optimum are preferred since a lower temperature slows down bacterial growth and gives more striking differential effects. Growth of several bacterial species can occur even at temperature near to the freezing point of water.

The amount of growth can be measured by a suitable method known to the experienced microbiologist. For example, since low levels of ionizing radiations are capable of stimulating the growth of slow growing hydrogen-utilizing and hydrocarbon-oxidizing bacteria, and since the amount of growth in a given period of time is directly proportional to the dose of radiation, it is possible to actually measure such dose by calibrating a certain bacterial strain in such a way that a certain amount of growth, under standard conditions, will correspond to a determined dose of radiation. This can be attained by controlling the number of cells which are introduced in each test tube, by carefully checking the atmosphere in the test tubes, and by knowing the amount of growth of the specific strain produced in a specific culture medium at a given temperature, after a given period of time, in the presence and in the absence of ionizing radiations. A strain can be previously calibrated in the laboratory using an artificial source of radiation, such as an X-ray tube, a cyclotron, or a specific amount of radioactive substance.

The method described above utilizes completely sealed glass test tubes through which only the hard beta and gamma radiations will penetrate. Alpha and soft beta radiations will not penetrate the glass of the test tubes, so for their detection other types of test tube material may be used. However, the detection of hard beta and gamma radiations is the most important so far as prospecting for radioactive minerals is concerned. The effect of other ionizing particles such as protons and neutrons, as well as other penetrating particles or radiations which may be present when monitoring for radioactivity in general will also be detected.

The method described herein utilizes the use of hydrogen-utilizing and hydrocarbon-oxidizing bacteria for detecting low levels of ionizing radiations; however, it is evident that the present invention may be practiced by using other bacteria, microorganisms, or other living cells which are found to be suitable. Furthermore, while this invention relies on a particular effect on growth, it is evident that the observation of other effects, such as retardation of growth, variation in cell motility, variation in cell size, or variation in cell metabolism can be used to practice the present invention.

The present invention may also find useful application in checking the dosage of X or other rays employed on patients in the treatment of various diseases, especially in view of the fact that roentgen meters, however sensitive, may not always be properly calibrated, and may not reveal the actual threshold of injurious effects.

Obviously many modifications and variations of the present invention are possible in the light of the above teachings. It is therefore to be understood, that within the scope of the appended claims, the invention may be practiced otherwise than as specifically described.

What is claimed is:

1. The method of monitoring for low-level radioactivity comprising the steps of introducing a suspension of hydrogen-utilizing bacteria into an assembly of test tubes, one-half of which are unshielded glass tubes and the other half glass tubes shielded by lead, all containing a culture medium; filling the tubes of said assembly with hydrogen gas and sealing to a leak-proof condition; placing said assembly in the ocean at a predetermined depth, maintaining said assembly in place for a selected length of time, withdrawing said assembly for examination, and comparing the cultures in the shielded and unshielded tubes to ascertain the amount of growth of the bacteria resulting from stimulation by radiation, for determination of the presence and location of a radioactivity source.

2. The method of claim 1 wherein the bacteria used are a hydrocarbon-oxidizing species.

3. The method of prospecting for radioactive elements which comprises distributing and positioning test tubes containing living cell cultures in an area according to the outcrop geometry of a radioactive mineralized zone, said cells being of a type the growth of which is stimulated by radiation, and observing the growth of the cell-cultures for thereby determining gradients of intensity variations and the location of the radioactive mineral body.

4. The method of prospecting for radioactive elements comprising the steps of orienting in a selected area four living cell cultures maintained inside sealed glass test tubes and four living cell cultures maintained inside sealed lead shielded test tubes for a selected length of time, said cells being of a type the growth of which is stimulated by radiation, and measuring the difference in growth between the cultures in the glass tubes and those in the lead shielded tubes.

5. The method of claim 4 in which the living cells are hydrogen-utilizing bacteria.

6. The method of claim 4 in which the living cells are hydrocarbon-oxidizing bacteria.

7. The method of prospecting for radioactive elements which comprises the steps of placing four pairs of test tubes containing living cell cultures near a source of radiation, said cells being of a type the growth of which is stimulated by radiation; a pair being placed in the direction of each of four cardinal points in order to detect directional effects of radiation on the growth of said cell cultures; said pairs of tubes consisting of one glass tube and one lead shielded glass tube whereby one culture is exposed to the radiation and the other shielded from the radiation.

8. The method of monitoring for low-level radioactivity comprising the steps of inoculating a culture medium contained in test tubes with a suspension of microorganisms of a type stimulated in growth by radiation, filling said tubes with atmosphere, sealing said tubes, calibrating the resulting microorganism culture under standard conditions, placing said tubes in a body of water at a predetermined depth, withdrawing said tubes after a predetermined period of time, and measuring the growth of the microorganisms in the tubes.

References Cited in the file of this patent

UNITED STATES PATENTS

| | | |
|---|---|---|
| 2,700,736 | Roberts | Jan. 25, 1955 |
| 2,858,447 | Taplin | Oct. 28, 1958 |

OTHER REFERENCES

Applied Microbiology, vol. 4, 1956, pages 143 to 155, a series of articles by Koh et al., Bridges et al., Pepper et al., and a second article by Koh et al.

Microbial Monitors, by Chandler, Nucleonics, vol. 17, No. 10, October 1959, pages 63 and 64.